United States Patent [19]

Tanaka et al.

[11] 4,417,290
[45] Nov. 22, 1983

[54] MULTI-LAYER MAGNETO-OPTICAL RECORDING MEDIUM

[75] Inventors: Shinsuke Tanaka, Kawasaki; Nobutake Imamura, Tokyo; Chuichi Ota, Fuchu, all of Japan

[73] Assignee: Kokusai Denshindenwa Co., Ltd., Tokyo, Japan

[21] Appl. No.: 294,310

[22] Filed: Aug. 19, 1981

[30] Foreign Application Priority Data

Aug. 25, 1980 [JP] Japan ................ 55-115847

[51] Int. Cl.$^3$ .............................. G11B 5/74
[52] U.S. Cl. ................... 360/131; 360/134
[58] Field of Search ............ 360/131, 59, 134; 428/667, 636, 900–913, 621, 447

[56] References Cited

U.S. PATENT DOCUMENTS 3,928,870 12/1975 Ahrenkiel et al. ........... 360/131 X
4,202,932 5/1980 Chen et al. .................. 360/131 X

OTHER PUBLICATIONS

Lazzari, "Thin-Film Head Study for Perpendicular Recording", IEEE Trans. on Magnetics, vol. Mag-17, No. 6, Nov. 1981.

Manuel, "Vertical Recording Promises New Era", Electronics, Apr. 1982.

*Primary Examiner*—Alfred H. Eddleman
*Assistant Examiner*—K. Wong

[57] ABSTRACT

A multi-layer magneto-optical recording medium is constructed by placing a transparent protective film upon a magneto-optical recording medium wherein the easy axis of magnetization is provided perpendicular to the film surface so as to make the direction of magnetization perpendicular thereto to take a binary code depending on whether the vertical direction thereof is upward or downward, and further by placing a metal film, of which melting point is lower than either said magneto-optical recording medium and said transparent protective film, upon said transparent protective film.

The metal film is evaporated by a laser beam irradiated thereon in a manner to leave a portion thereof not evaporated to become a tracking guide, whereby reproducing a magneto-optical record free of disturbance on linear polarization.

The metal film can be perforated to form pits by irradiation of a laser beam. Presence or absence of such pits can be used for storing data and, therefore, is applicable for a read-only memory of optical method or an optical video disc.

1 Claim, 9 Drawing Figures

MULTI-LAYER MAGNETO-OPTICAL RECORDING MEDIUM

BACKGROUND OF THE INVENTION

The present invention concerns a magneto-optical memory, and more specifically a magneto-optical recording medium which is easy to designate an address, enables rewriting thereof and has a construction usable as an optical video disc medium.

DESCRIPTION OF THE PRIOR ART

In prior art, there have been known MnBi, MnAlGe, GdFe, TbFe, GdCo among others as materials for recording media for magneto-optical memories. Such materials are formed to be a thin film on a substrate of, for instance, glass or silicon wafers by using the vacuum evaporation method or the spattering method. The characteristics common to these magneto-optical recording media are:

(1) The easy axis of magnetization is perpendicular to the film surface, and (2) The Curie point and the magnetic compensation point are relatively low.

Since the easy axis of magnetization is provided perpendicular to the film surface if the recording medium is used as a memory, the memory as shown in FIG. 1 can distinguish the state "1" from the state "0" by whether it is upward magnetization 1 perpendicular to the film surface on a glass substrate 3 or downward magnetization 2 thereto to obtain a binary code as a digital memory. The memory is, for instance, stored as follows; the whole film surface is first kept at the state "0" or at downward magnetization and then a laser beam is focused on the portion where a state of "1" should be recorded. As the temperature of the portion where laser beams have been focused increases, the magnetic coercive force Hc decreases. Therefore, if a weak external magnetic field is kept applied in the direction of "1" at the time of laser beam irradiation, the irradiated portion is inverted in magnetic field to become the state "1" or upward in magnetization since the magnetic coercive force Hc thereon has decreased. The memory of "0" remains where the laser beam is not irradiated since the initial state was "0". FIG. 2 indicates an example of the recording pattern thus recorded. More particularly in FIG. 2, in a vertical magnetic recording medium 4 in a form of a film placed on a glass substrate 3, the magnetic recording pattern is formed by the portion 5 which corresponds to the state "1" where magnetic field is inverted by irradiation of a laser beam and the portion 6 which corresponds to the state "0" where magnetization is directed downward without being irradiated by a laser beam.

The portion to memorize is arbitrarily chosen without considering addresses for the convenience of description hereinabove. However, in practice when constructing a magneto-optical disc etc., it is not desirable to address a laser beam and record with a higher density at an arbitrary location without tracking guide because a higher mechanical precision is required, presenting inconvenience in manufacture as well as use. This can be said for optical-read-out, too. In the prior art magneto-optical memory system, partly because a large size gas laser was used as the laser for the optical-read-out, the gas laser was unavoidably fixed and thus an extremely high precision in rotation of a disc was required. In recent years, however, as the technology in semiconductor laser has progressed, the portion needed for optical-write-in/read-out can be made compact in size as well as light in weight. Accordingly, it has been made possible that an optical recording/reproducing head is made to move along a guide which is provided on a memory medium in a form of a tracking guide.

For instance, in the conventional optical video disc which uses the presence or the absence of reflection on a memory medium as a binary code, the optical memory medium 7 is crenellated as the reference numeral 8 illustrates in FIG. 3 to be used as a tracking guide. In the case of this tracking guide, as shown in FIG. 4, it is adopted to focus three light spots 9a, 9b and 9c on the same track and, if the central spot 9b deviates from the center of the track, either one of the spots at both sides 9a and 9c moves from the track toward the ridge of the crenellation while the other one moves toward into the groove thereof. Due to the difference in reflectance between the ridge and the groove, when the spot deviates from the track, the spots 9a and 9c make a differential signal appear in the reflection light detector. By adjusting the position of a lens by using this differential signal, the spot can be focused on the track to follow the track. Therefore, in the optical memory medium 7, as far as the reflectance in the track used as a memory differs from that in the track not to be used as a memory, an optical recording/reproducing head of track following type can be used for recording as well as for read-out.

In the optical reproducing of the magneto-optical memory, as illustrated in FIG. 5, if three light spots 9a and 9b and 9c are focused on the lines of bits 10a, 10b and 10c which have been written beforehand as is the case of FIG. 4, the track can be followed simply by detecting the rotational factor on the polarized plane of the reflected light. In the case of an optical video disc, too, if the starting position is fixed and if there is no necessity to jump to any predetermined address, the track can be followed by using such a method as the three beam spot method based on already-written bits similarly to the case of the above mentioned magneto-optical memory, without using such a crenellated guide as illustrated in FIG. 3. In the tracking method as shown in FIG. 5, however, since already-written bits are used for tracking it is impossible to track nor to address if there are no bits for a length and further in the case of magneto-optical memory, it can not effectively use the rewritability which is one of the unique characters of this method. Therefore, it is preferable to provide a track guide by some means for such magneto-optical memory, too. Since the magneto-optical memory utilizes the rotation on the polarized plane achieved by the Magnetic Kerr Effect, if the memory medium is once crenellated as shown in the case of the optical video disc in FIG. 4, the light on the gap reflects diffusely to disturb linear polarization and thus might cause noises creating difficulties in optical detection.

As a method to provide a tracking guide for a memory medium without crenellation thereon, there has been proposed a method to thermally process a portion of the medium by applying a laser beam sweepingly thereover so that regions 11, 12 having a difference either in reflectance or magnetic coercive force are provided on the same plane to be used as a tracking guide.

SUMMARY OF THE INVENTION

The present invention focuses attention on the above mentioned conventional difficulties and aims to provide a multi-layer magneto-optical recording medium by placing an optical video disc medium upon a magneto-optical memory medium in a lamination and thus to offer a multi-layer magneto-optical recording medium which had advantages of both medium types, enables erasing and rewriting as well as addressing, and is interchangeable with conventional optical video discs. In order to attain such an aim, the recording medium according to the present invention comprises a magneto-optical recording medium wherein an easy axis of magnetization is provided perpendicular to the film surface and the direction of magnetization is perpendicular thereto so as to take a binary code depending on whether the direction of magnetization is upward or downward, a transparent protective film placed upon said magneto-optical recording medium and a metal coating film placed upon said transparent protective film having a melting point lower than both that of said transparent protective film and that of said magneto-optical recording medium.

BRIEF DESCRIPTION OF THE DRAWINGS

FIG. 1 is a schematic view to explain the concept of magneto-optical recording method, while

FIG. 5 is a schematic view to explain a tracking example in a magneto-optical memory while

DETAILED DESCRIPTION OF THE PREFERRED EMBODIMENT

Figure 1:
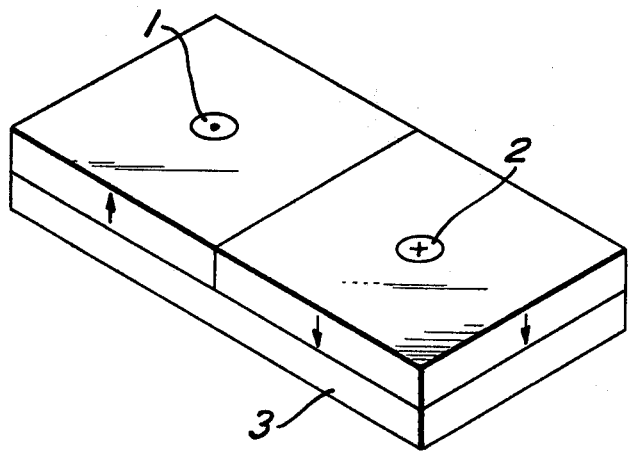
Figure 2:
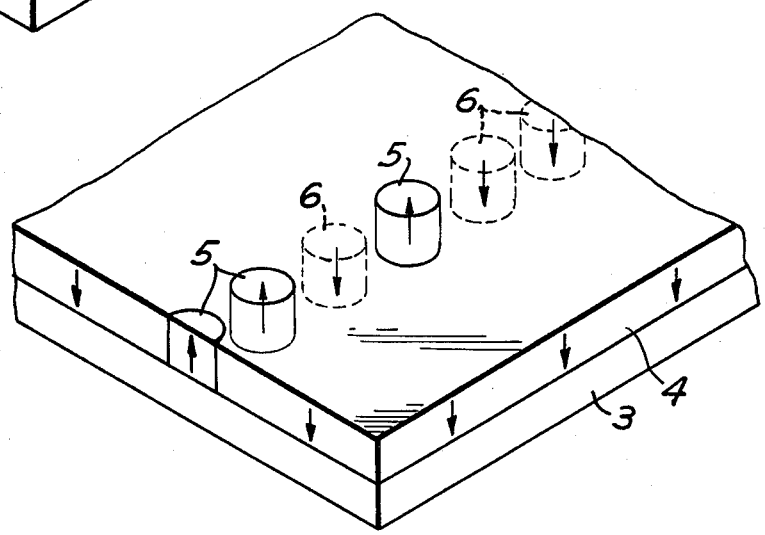
FIG. 2 is a view to illustrate an example of the magnetic recording pattern thereof.

The present invention will now be explained in detail referring to the drawings.

Figure 7:
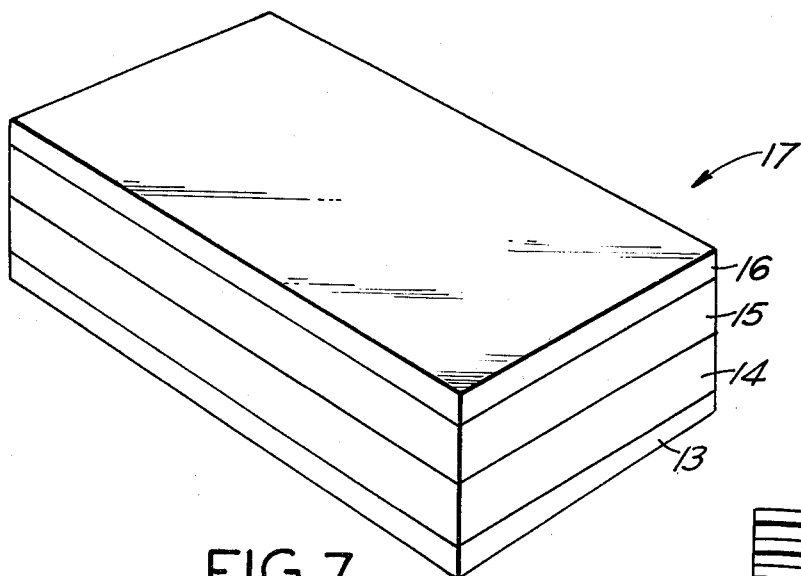
FIG. 7 is a perspective view to show an embodiment of the multi-layer magneto-optical recording medium according to the present invention.

FIG. 7 illustrates an embodiment according to the present invention wherein the reference numeral 13 denotes a substrate of, for instance, glass, 14 a magneto-optical recording medium made of an amorphous alloy thin film, 15 a transparent protective film made of $SiO_2$ (Silicon di-oxide) etc., and 16 a metal film having a low melting point made of Te (Tellurium) etc. Such a material as GdFe, TbFe, GdCo etc. is formed as an amorphous alloy metal thin film 14 by the vacuum evaporation or the spattering method upon a glass substrate 13. The amorphous alloy thin film 14 is coated with a transparent protective film 15 of $SiO_2$ and the $SiO_2$ film 15 is further coated with Te thin film 16 to form a multi-layer magneto-optical recording medium 17.

Figure 6:
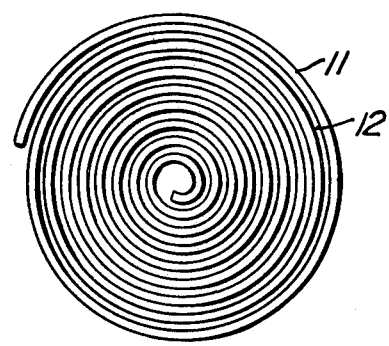
FIG. 6 is a view to explain another tracking example.
Figure 8:
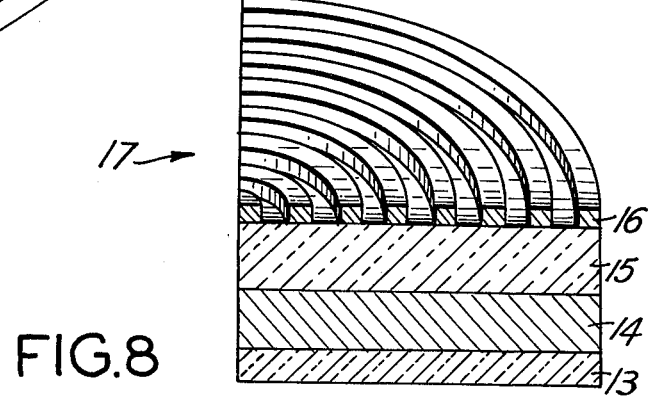
FIG. 8 is a view to explain an example when the above multi-layer magneto-optical memory is used as a magneto-optical memory medium.

The multi-layer magneto-optical recording medium 17 is operated as follows to record signals which would later require erasing or rewriting. First a laser beam is applied sweepingly over the topmost layer or the low melting point metal film 16 to evaporate the film 16 in a form of a spiral as shown in FIG. 6 so as to obtain the crenellation shown in FIG. 8. By using this crenellation as a tracking guide or in other words by detecting the difference between the reflectance of the ridge (the low melting point metal film 16) and the groove (the amorphous alloy film 14), the optical recording head is moved along the groove to record the binary signals on the amorphous alloy thin film 14 in a manner similar to the conventional method utilizing vertical directions of magnetization. Then the changes on the polarized plane caused by the light reflected from the said amorphous alloy thin film 14 is detected to find the direction of magnetization in reading out. Since there is no gaps on the amorphous alloy thin film 14 itself, no disturbance is caused in the linear polarization. Although the said two reflection surfaces, i.e., the surface of the low melting point metal film 16 and that of the amorphous alloy thin film 14, are specular, since a transparent protective film of $SiO_2$ 15 is sandwiched therebetween, the light reflected from the amorphous alloy thin film 14 is considerably weaken by this layer 15, making the difference in the reflectance between two films 16 and 14 sufficiently detectable. For instance, if the transparent protective film of $SiO_2$ is 0.15 μm, the ratio between them would become approximately 2:1.

Figure 3:
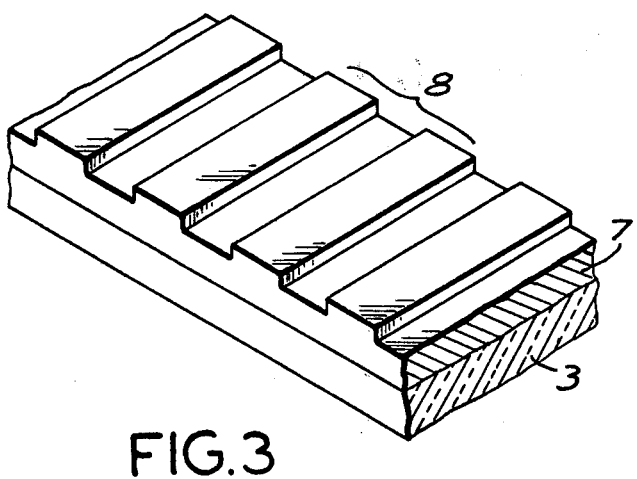
FIG. 3 is a view to show an example of optical guides in an optical video disc medium.
Figure 4A:
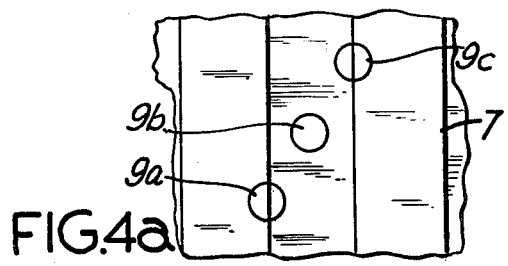
FIG. 4(a) illustrates a plane view thereof, and (b) a side cross sectional view.
Figure 4B:
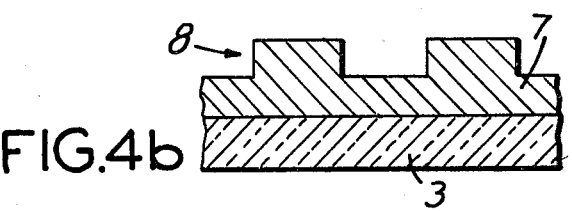
FIG. 4 concerns the method of tracking thereof and more particularly
Figure 5:
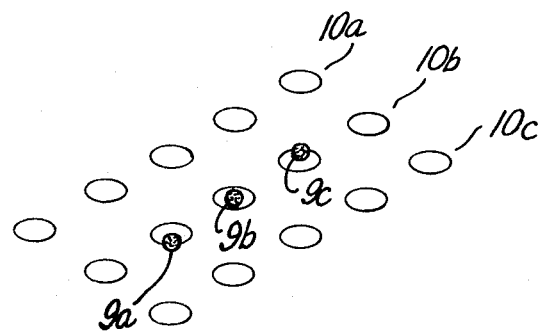

In a case a signal is stored permanently without erasing in the said multi-layer magneto-optical recording medium 17 or the medium is used as an optical video disc, the operation follows a procedure similar to the conventional optical video disc as below. In response to a signal, a laser beam is focused on a low melting point metal film 16 in a manner to strongly sweep the surface thereof to evaporate the film 16 and to perforate pits. When reading out the memory, a laser beam of a lower intensity is used to detect the difference in the reflectance between the pitted portion or the underlying amorphous alloy film 14 and the unchanged surface or the low melting point metal film 16. In a manner similar to the conventional optical video disc, tracking is carried out either by using the differential signals caused by spots on the pitted surface as illustrated by the reference 9a and 9c in FIG. 5 or by using the differential signal caused by spots 9a and 9c on crenellated guide provided upon the topmost layer of the low melting point metal as illustrated in FIGS. 3 and 4. The crenellated guide is easily formed on the thin metal film having a low melting point 16 simply by either piling up another metal film on the portion to become the ridge or by removing the film to the extent to leave a bottom on the portion to become the groove.

What is common to both cases to use the multi-layer magneto-optical recording medium for an optical video disc medium and for a magneto-optical memory medium is the unique character utilizing the difference in reflectances between the low melting point metal film 16 and the underlying amorphous alloy film 14 for tracking. The above two differ from each other by the fact that the difference in reflectance is used for reading out as well as tracking in the case of the optical video disc while the rotation of the polarized plane of the reflected light caused by the direction of magnetization is used in the case of magneto-optical memory medium.

It should be noted that the film wherein the easy axis of magnetization is perpendicular to the film surface and the direction of magnetization is perpendicular to the film surface to take a binary code depending upon the direction thereof is not limited to the amorphous alloy thin film 14 of the materials indicated hereinabove;

further, the transparent protective film to be placed upon the above film could be of, for instance, $LiNbO_3$, $LiTaO_3$, etc. besides the $SiO_2$ film 15 mentioned above. The topmost layer of the metal film could be of various metal film coatings of alloys or non-alloys besides Tellurium thin film of the low melting point 16 mentioned above. However, it is critical that the melting point of the metal film coating should be lower than those of underlying transparent protective film and the magneto-optical recording medium because the metal film should be evaporated with a laser beam of a certain intensity while such underlying films should be protected from damages which might be inflicted by the laser beam irradiation. Therefore, Sn, Bi, Po, etc. would be desirable for the material of the metal film. When it is not to be used as an optical video disc medium, a tracking guide could be provided beforehand as shown in FIG. 6 with an arbitrary coating film having a reflectance different from that of the magneto-optical recording medium instead of coating the transparent protective film with the metal film.

As described hereinabove, as the multi-layer magneto-optical recording medium according to the present invention comprises an optical video disc medium, and a magneto-optical memory medium superposed thereon with a transparent protective film sandwiched therebetween, it can record-in as well as read-out from both media. When used as a magneto-optical memory medium, the optical video disc medium portion can be used as a tracking guide so as to conduct erasing, rewriting or addressing operations freely.

We claim:

1. A multi-layer magneto-optical recording medium comprising a magneto-optical recording substrate wherein an easy axis of magnetization is provided perpendicular to a film surface and the direction of magnetization is perpendicular to the film surface to take a binary code depending on whether the direction of magnetization is upward or downward, a transparent protective film placed upon said magneto-optical recording substrate and a metal film having a melting point lower than that of both said transparent protective film and said magneto-optical recording substrate is disposed upon said transparent protective film.

* * * * *